United States Patent Office 3,166,528
Patented Jan. 19, 1965

3,166,528
PROCESS FOR THE PREPARATION OF 14α-METH-YL 11-KETOPROGESTERONE AND INTERMEDI-ATES PRODUCED THEREFROM
Philip F. Beal, Kalamazoo, Mich., assignor to The Upjohn Company, Kalamazoo, Mich., a corporation of Delaware
No Drawing. Filed July 27, 1962, Ser. No. 213,056
20 Claims. (Cl. 260—239.55)

This invention relates to a novel process for the preparation of steroids and is more particularly concerned with a novel synthesis of 14α-methyl-11-ketoprogesterone and novel steroids produced as intermediates in the synthesis thereof.

The compound 14α-methyl-11-ketoprogesterone is a valuable intermediate in the preparation of 14α-methylcortisone, 14α-methylhydrocortisone, and related compounds as described in U.S. Patent 2,813,111. Hitherto 14α-methyl-11-ketoprogesterone has only been available by degradation of lanosterol using a lengthy procedure as set forth in U.S. Patent 2,782,212. Further, lanosterol, which is obtained from sheep wool fat, is difficult to obtain free from closely related compounds thus adding to the difficulty of obtaining adequate supplies of 14α-methyl-11-ketoprogesterone.

The present invention makes available for the first time a convenient and economically attractive route to 14α-methyl-11-ketoprogesterone from readily available starting materials.

The present invention consists in a process for the preparation of 14α-methyl-11-ketoprogesterone from the readily available starting material 14α-methyl-11,15-diketoprogesterone. The reaction steps involved in this process are set forth schematically below.

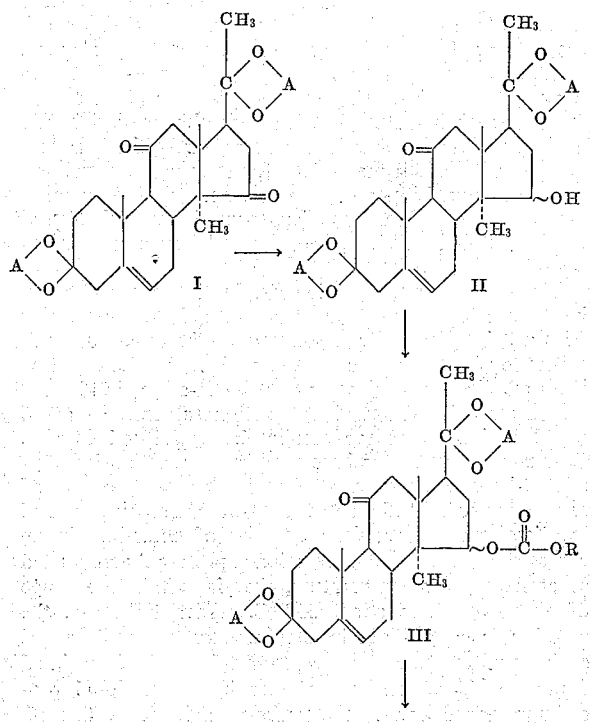

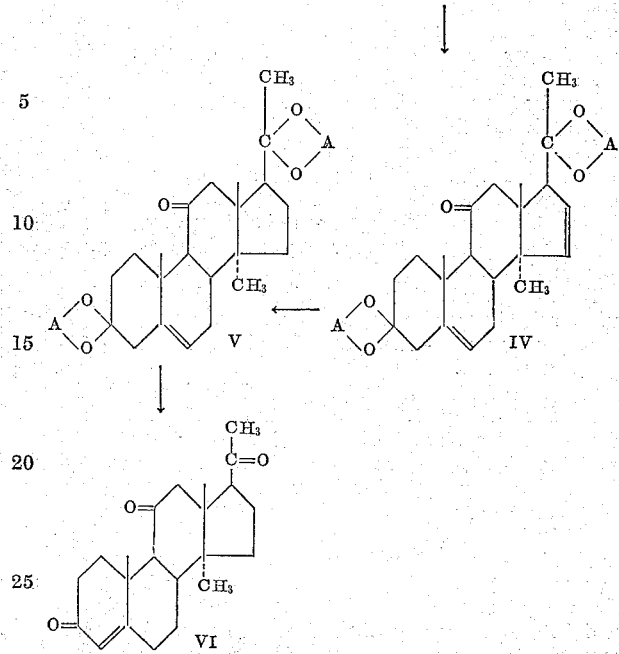

In the above formulae A is an alkylene radical containing from 2 to 6 carbon atoms, inclusive, wherein the attaching oxygen to carbon bonds are separated by a chain of at least 2 and not more than 3 carbon atoms, such as ethylene, propylene, dimethyl propylene, and the like, and R is a lower-alkyl radical such as methyl, ethyl, propyl, butyl, amyl, hexyl, and isomeric forms thereof. The wavy line, when used in the above formulae and throughout the specification, is a generic expression indicating the α or β configuration or mixtures thereof.

In the process of the invention a 3,20-bis ketal of 14α-methyl-11,15-diketoprogesterone (I) is reduced selectively to the corresponding 14α-methyl-15-hydroxy-11-ketoprogesterone-3,20-bis ketal. The reduction is effected using an alkali metal borohydride such as potassium borohydride, sodium borohydride, and the like, in solution in an inert organic solvent such as dioxane, tetrahydrofuran, and a lower-aliphatic alcohol such as methanol, ethanol, isopropyl alcohol, and the like, or mixtures of these solvents with water. The reaction is preferably conducted at or about room temperature (25° C.). The desired product (II) is isolated from the reaction mixture by conventional procedures; for example, by acidification of the reaction mixture followed by evaporation of the organic solvent and filtration of the resulting slurry. The product so obtained is generally a mixture of the 15α- and 15β-epimers of the compound (II). This mixture can be separated by chromatography, fractional crystallization and like conventional procedures. Either of the so-purified epimers of (II), or the mixtures thereof without separation of the epimers, can be deketalized using mineral acid hydrolysis, for example, by treatment with sulfuric acid, hydrochloric acid, or the like, in the presence of an inert organic solvent such as acetone to yield the corresponding 14α-methyl-15-hydroxy-11-ketoprogesterone.

The mixture of the 15α- and 15β-epimers of compound (II), or either of the individual epimers, can be converted to the corresponding 15-alkyl carbonate (III). Advantageously, the reaction is carried out by heating a mixture of the compound (II) and the appropriate dialkyl carbonate in the presence of a solvent such as benzene, toluene, xylene, and the like, which forms an azeotrope with water. The reaction is preferably conducted at elevated temperatures and most conveniently at the reflux temperature of the reaction mixture, the water eliminated in the reaction being removed azeotropically. Preferably the above condensation is effected in the presence of a basic catalyst such as an alkali metal hydride, for example, sodium hydride, lithium hydride, and the like. The catalyst is added to the reaction mixture in the form of a dispersion in an inert organic solvent preferably a high boiling hydrocarbon oil. The desired product (III) is isolated from the reaction mixture by conventional procedures, for example, by filtration followed by evaporation of the filtrate and purification of the crude product (III) by conventional procedures such as recrystallization, chromatography, or the like, or any combination of these steps.

The compound (III) so obtained can be deketalized using acid hydrolysis as described above to give the corresponding 14α - methyl - 15 - alkylcarbonato - 11-ketoprogesterone.

In the next step of the process of the invention the compound (III), preferably those compounds in which R is methyl, is subjected to pyrolysis to yield the corresponding 15(16)-dehydro compound (IV). The pyrolysis is effected readily by heating the compound (III) in a solid state at elevated temperatures of the order of 300 to 350° C. for a short period. The compound (IV) so obtained can be purified by conventional procedures, for example, chromatography, recrystallization, and the like. The compound (IV) can be deketalized using mineral acid hydrolysis, as described above, to yield the corresponding 14α-methyl - 11 - keto-15(16)-dehydroprogesterone.

In the next stage of the process of the invention the 15(16)-double bond in compound (IV) is hydrogenated to produce the corresponding ketal (V) of 14α-methyl-11-ketoprogesterone. The hydrogenation can be effected by treating the compound (IV) with hydrogen in the presence of a hydrogenation catalyst such as palladium on charcoal, platinum oxide, and the like. The conditions employed are those conventional in the art for the catalytic hydrogenation of double bonds in the steroid nucleus. The compound (V) so obtained can be isolated from the reaction mixture by conventional procedures, for example, by removal of the catalyst by fermentation and evaporation of the filtrate. The compound (V) can be purified by conventional procedures such as by crystallization, chromatography, and the like.

In the final stage of the process of the invention the compound (V) is deketalized by mineral acid hydrolysis using the precedure described above to obtain the desired compound 14α-methyl-11-ketoprogesterone (VI).

The compounds having the Formulae II, III, and IV, as well as the free 3,20-diones, produced therefrom by acid hydrolysis, in addition to their usefulness as intermediates in the above described process possess useful physiological and pharmacological properties. Illustratively, the above-named compounds exhibit progestational activity which makes them useful as oral and parenteral progestational agents in the same manner as is conventional for the use of progesterone. The above-named compounds also possess central nervous system depressant activities which makes them useful as sedatives and as general anesthetics in mammals, particularly in animals. For example, the above-named compounds can be used as sedatives and anesthetics in the laboratory manipulation of experimental animals such as mice and rats. The above-named compounds also exhibit anti-aldosterone and mineralocorticoid activity.

The above-named compounds can be prepared and administered to birds and mammals, including valuable domestic animals, in a wide variety of oral or parenteral dosage forms, singly or in admixture with other active compounds. They can be associated with a pharmaceutical carrier which can be solid material or a liquid in which the compound is dissolved, dispersed or suspended. The solid compositions can take the form of tablets, powders, capsules, pills, or the like, preferably in unit dosage forms in, for example, admixtures or precise dosages. The liquid compositions can take the form of solutions, emulsions, suspensions, syrups, or elixirs.

The compounds having the Formula IV above are also useful as intermediates in the preparation of 14α-methylcortisone, 14α-methylhydrocortisone by an alternate route which does not proceed via the compound (VI). Thus the compounds having the Formula IV can be partially deketalized by hydrolysis under mildly acidic conditions, for example, by treatment with a dilute mineral acid in solution in a solvent such as tetrahydrofuran at approximately 25° C. to obtain the corresponding 14α-methyl-11-keto-15(16)-dehydroprogesterone 3-alkylene ketal. The latter compound is then isomerized by treatment with a base, for example, sodium hydroxide, potassium hydroxide, and the like, in the presence of a solvent such as a lower alkanol, i.e., methanol, ethanol, and the like, to obtain the corresponding 14α-methyl-11-keto-16(17)-dehydroprogesterone. The latter compound is then converted to 14α-methylcortisone using the procedure described by Julian, J. Amer. Chem. Soc. 72, 5145 (1950), as modified by Ringold et al., J. Amer. Chem. Soc. 78, 816 and 820 (1956), for the conversion of 16-dehydropregnenolone to cortexolone. The 14α-methylcortisone is then converted to 14α-methylhydrocortisone and to the corresponding Δ¹-derivatives of 14α-methylcortisone and 14α-methylhydrocortisone by procedures well-known in the art for the oxidation of cortisone to hydrocortisone and for the conversion of cortisone and hydrocortisone to the corresponding Δ¹-derivatives.

The compound having the Formula I above which is employed as starting material in the process of the invention is readily prepared from the corresponding 3,20-bis ketal of 15α-hydroxy-11-ketoprogesterone. The latter compound is oxidized to give the corresponding 11,15-diketoprogesterone 3,20-bis ketal. The oxidation is effected using oxidizing agents such as chromic acid, sodium dichromate, and the like, under conditions well-known in the art for the oxidation of steriod secondary alcohols to the corresponding ketones. The 11,15 - diketoprogesterone 3,20-bis ketal so obtained is then methylated by reaction with a methyl halide, preferably methyl iodide in the presence of a base. Advantageously, the base employed is the alkali metal salt, for example, the sodium, potassium, or lithium salt of a lower aliphatic alcohol such as methanol, ethanol, isopropanol, butanol, t-butyl alcohol, and the like. The preferred base is potassium t-butoxide.

The methylation is carried out in the presence of an inert organic solvent, that is, an organic solvent which does not interfere with the course of the reaction. Advantageously, when the base employed in the reaction is an alkali metal derivative of a lower-aliphatic alcohol, said alcohol is also used as reaction solvent, the alkali metal derivative of the alcohol being formed in situ. For example, when the base used in the reaction is potassium t-butoxide, t-butyl alcohol is preferably employed as reaction solvent, the potassium t-butoxide being formed by dissolving the requisite quantity of potassium in an excess of t-butanol. The reaction is preferably conducted at or near room temperature, that is, within the range of about 0° C. to about 35° C. Advantageously, the reaction is carried out in the presence of an inert gas such as nitrogen. The desired product (I) is isolated from the above reaction mixture by conventional procedures, for example, the reaction mixture is filtered, the filtrate is evaporated to dryness and the residue is subjected to solvent extraction. Purification of the compound (I) is effected by conventional procedures such as chromatography, recrystallization, and the like.

The following preparations and examples are illustrative of the process and products of the present invention, but are not to be construed as limiting.

PREPARATION 1

15α-hydroxy-11-ketoprogesterone

A medium was prepared of 10 g. of Cerelose (dextrose), 20 g. of corn steep liquor, and 1,000 ml. of water and adjusted to a pH between 5.5 and 6. Twelve liters of this sterilized medium was inoculated with spores of Penicillium urticae ATCC 10120 and incubated for a period of 24 hours at a temperature of 26° C., using a rate of aeration and stirring such that the oxygen uptake was 13 millimoles per hour per liter of $Na_2SO_3$, according to the method of Cooper, Fernstrom and Miller, Ind. Eng. Chem. 36, 504 (1944). To this medium containing a 24-hour growth of Penicillium urticae was added 2 g. of 11-ketoprogesterone, dissolved in 100 ml. of acetone. After an additional 24-hour period of incubation under the same conditions of temperature and aeration, the beer and mycelium were separated. The mycelium was filtered, washed twice, each time with a volume of acetone approximately equal to the volume of the mycelium, and extracted twice, each time with a volume of methylene chloride approximately equal to the volume of the mycelium. The acetone and methylene chloride extracts, including solvent, were added to the beer filtrate and the combined extracts and beer filtrates were extracted successively with two one-half by volume portions of methylene chloride and then with two one-fourth by volume portions of methylene chloride. The methylene chloride extracts were washed with two one-tenth by volume portions of a 2 percent aqueous solution of sodium bicarbonate and then with two one-tenth by volume portions of water. After drying the methylene chloride extracts with anhydrous sodium sulfate and filtering, the solvent was distilled from the filtrate. The residue thus obtained was recrystallized twice from acetone and ether in 1 to 1 ratio and once from acetone and Skellysolve B to give 15α-hydroxy-11-ketoprogesterone having a melting point of 227 to 229° C., $[\alpha]_D^{20}$ +257° (in EtOH).

PREPARATION 2

3,20-bis(ethylene ketal) of 15α-hydroxy-4-pregnene-3,11,20-trione

A mixture of 4.75 g. of 15α-hydroxy-11-ketoprogesterone, 100 ml. of benzene, 5 ml. of ethylene glycol and 0.1 g. of para-toluenesulfonic acid was heated under reflux with stirring under a water trap for 6 hrs. The mixture was then cooled and the product crystallized. The acid was neutralized by the addition of 10 ml. of saturated sodium bicarbonate solution and the mixture stirred for 15 minutes. The crystalline precipitate was removed by filtration and oven-dried. The product was recrystallized from acetone containing a drop of pyridine, to yield 2 g. of crystals melting at 248 to 250° C. A second crop furnished 0.80 g. The original filtrate was evaporated and this residue and also the second crop were recrystallized to yield an additional 1.12 g. of the 3,20-bis(ethylene ketal) of 15α-hydroxy-4-pregnene-3,11,20-trione having a melting point of 246 to 248° C.

Analysis.—Calcd. for $C_{25}H_{36}O_6$: C, 69.42; H, 8.59. Found: C, 69.41; H, 8.42.

$[\alpha]_D$ +62° (acetone);

$\lambda_{max.}^{Nujol}$ 3530, 1695, 1100 cm.$^{-1}$

In the same manner as shown in Preparation 2, but replacing ethylene glycol by other 1,2-alkanediols or 1,3-alkanediols having the formula HO—A—OH, wherein A has the significance hereinbefore defined, there are obtained the corresponding 3,20-bis ketals of 15α-hydroxypregn-4-ene-3,11,20-trione such as the 3,20-bis(2,2-dimethyl-1,2-propylene ketal), 3,20-bis(1,2-propylene ketal), 3,20-bis(1,3-butylene ketal) and the like.

PREPARATION 3

3,20-bis(ethylene ketal) of pregn-4-ene-3,11,15,20-tetrone

A solution of 5.0 g. of 15α-hydroxy-11-ketoprogesterone 3,20-bis(ethylene ketal) in 50 ml. of pyridine was added to a solution of 5 g. of chromium trioxide in 50 ml. of pyridine. The reaction mixture was allowed to stand overnight before being diluted with 300 ml. of water and extracted with methylene chloride. The solvent was removed in vacuo and the product was recrystallized from a mixture of acetone and Skellysolve B (commercial hexanes) to give 2.6 g. of pregn-4-ene-3,11,15,20-tetrone 3,20-bis(ethylene ketal) in the form of a crystalline solid having a melting point of 198 to 206° C. A sample of the material was recrystallized twice from the same solvent to give pure compound having a melting point of 208 to 210° C.; $[\alpha]_D^{20}$ —16° (acetone).

Using the same procedure but replacing 15α-hydroxy-11-ketoprogesterone 3,20-bis(ethylene ketal) by the corresponding 3,20-bis(2,2-dimethyl-1,2-propylene ketal), 3,20-bis(1,2-propylene ketal) and 3,20-bis(1,3-butylene ketal), there are obtained the 3,20-bis(2,2-dimethyl-1,2-propylene ketal), 3,20-bis(1,2-propylene ketal) and 3,20-bis(1,3-butylene ketal), respectively, of pregn-4-ene-3,11,15,20-tetrone.

PREPARATION 4

3,20-bis(ethylene ketal) of 14α-methylpregn-4-ene-3,11,15,20-tetrone

A solution of potassium tert.-butoxide was prepared from 44.5 g. of potassium and 1300 ml. of tert.-butyl alcohol. To this solution, under an atmosphere of nitrogen, was added with stirring 9.77 g. of pregn-4-ene-3,11,15,20-tetrone 3,20-bis(ethylene ketal) and the mixture so obtained was stirred for 1 hr. at approximately 25° C. To the resulting mixture (cooled to 10° C.) was added 142 ml. of methyl iodide and the mixture so obtained was stirred for several hours at approximately 25° C. The solid which had separated was isolated by filtration, and washed well with tert.-butyl alcohol. The filtrate was evaporated to dryness at 40° C. under reduced pressure. The residue was treated with water and the aqueous mixture was extracted thoroughly with methylene chloride. The methylene chloride extracts were combined, washed with water, and dried over anhydrous sodium sulfate. The dried solution was filtered and the filtrate was evaporated to dryness at 30° C. under reduced pressure. The residue (11.69 g.) was dissolved in 200 ml. of warm benzene, the solution obtained was diluted with 600 ml. of Skellysolve B and the resulting mixture was concentrated at room temperature under a stream of nitrogen. The solid which separated was isolated by filtration, washed with a mixture of benzene and Skellysolve B, and dried. The material so obtained (2.82 g.; M.P. 282 to 291° C.) was recrystallized from benzene. There was thus obtained 2.68 g. of the 3,20-bis(ethylene ketal) of 14α-methylpregn-4-ene-3,11,15,20-tetrone in the form of a crystalline solid having a melting point of 298 to 300° C.; $[\alpha]_D^{20}$ +32° (chloroform).

Analysis.—Calcd. for $C_{26}H_{36}O_6$: C, 70.25; H, 8.16. Found: C, 70.27; H, 8.10.

The infrared spectrum of the compound (mineral oil mull) exhibited maxima at 1730, 1698, 1675 sh., 1145, 1135, 1115, 1103, 1085, 1065, 1050, 1038, 1023, and 1015 reciprocal centimeters. The ultraviolet spectrum of the compound (chloroform solution) exhibited a maximum at 297 millimicrons ($a_M$=69).

Using the same procedure, but replacing the 3,20-bis (ethylene ketal) of pregn-4-ene-3,11,15,20-tetrone by the corresponding 3,20-bis(2,2-dimethyl-1,2-propylene ketal), 3,20-bis(1,2-propylene ketal), and 3,20-bis(1,3-butylene ketal), there are obtained the 3,20-bis(2,2-dimethyl-1,2-propylene ketal), 3,20-bis(1,2-propylene ketal) and 3,20-bis(1,3-butylene ketal), respectively, of 14α-methylpregn-4-ene-3,11,15,20-tetrone.

EXAMPLE 1

*15-hydroxy-14α-methylpregn-4-ene-3,11,20-trione 3,20-bis(ethylene ketal)*

A solution of 1.45 g. of 14α-methylpregn-4-ene-3,11,15,20-tetrone 3,20-bis(ethylene ketal) in 150 ml. of dioxane (which had been freshly filtered through a bed of activated alumina to remove peroxides) was stirred and treated with 3 g. of sodium borohydride in 20 ml. of water. The mixture was stirred for several hours at approximately 25° C. before being made slightly acid by the addition of 50 percent aqueous acetic acid. The resulting mixture was distilled under reduced pressure to remove dioxane. The residue was filtered and the solid so recovered was dried in vacuo. There was thus obtained 1.15 g. of a mixture of the 15α- and 15β-epimers of 15-hydroxy - 14α - methylpregn-4-ene-3,11,20-trione 3,20-bis(ethylene ketal) in the form of a solid having a melting point of 226 to 229° C.

*Analysis.*—Calcd. for $C_{26}H_{38}O_6$: C, 69.92; H, 8.58. Found: C, 69.72; H, 8.60.

The pure 15α- and 15β-epimers of 15-hydroxy-14α-methylpregn-4-ene-3,11,20-trione 3,20-bis(ethylene ketal) can be obtained from the above mixture by subjecting the latter to chromatography on a column of magnesium silicate, eluting the column with Skellysolve B containing increasing proportions of acetone and combining and evaporating those fractions which, on the basis of infrared analysis and paper chromatographic analysis, are found to contain the desired materials.

Using the above procedure, but replacing 14α-methylpregn-4-ene-3,11,15,20-tetrone 3,20-bis(ethylene ketal) by the corresponding 3,20-bis(2,2-dimethyl - 1,2 - propylene ketal), 3,20-bis (1,2-propylene ketal) or 3,20-bis(1,3-butylene ketal), there are obtained the 15α- and 15β-epimers of the 3,20-bis(2,2-dimethyl-1,2-propylene ketal), 3,20-bis(1,2-propylene ketal), and 3,20-bis(1,3-butylene ketal), respectively, of 15-hydroxy-14α-methylpregn-4-ene-3,11,20-trione.

EXAMPLE 2

*15-hydroxy-14α-methylpregn-4-ene-3,11,20-trione 3,20-bis(ethylene ketal) 15-methylcarbonate*

To a solution of 1 g. of 15-hydroxy-14α-methylpregn-4-ene-3,11,20-trione 3,20-bis(ethylene ketal) [mixture of 15α- and 15β-epimers prepared as described in Example 1] in 36 ml. of benzene was added 18 ml. of dimethyl carbonate and the resulting mixture was heated under reflux for 30 minutes with azeotropic removal of water using a water separator. The reaction mixture was then cooled to about 35° C. and 1.15 g. of a 55.4 percent dispersion of sodium hydride in mineral oil was added. The mixture so obtained was stirred and heated under reflux under nitrogen for 20 hrs. The reaction mixture was then cooled and filtered, the insoluble material on the filter being rinsed with benzene. The filtrate and washings were combined and evaporated almost to dryness under reduced pressure. The residue was triturated with Skellysolve B and the crystalline solid which separated was isolated by filtration and recrystallized from methanol. There was thus obtained 0.94 g. of 15-hydroxy-14α-ethylpregn-4-ene-3,11,20-trione 3,20-bis(ethylene ketal) 15-methylcarbonate in the form of a crystalline solid having a melting point of 195 to 197° C.

*Analysis.*—Calcd. for $C_{28}H_{40}O_8$: C, 66.64; H, 7.99. Found: C, 66.84; H, 8.42.

The above mixture of 15α- and 15β-epimers of 15-hydroxy - 14α - methylpregn-4-ene-3,11,20-trione 3,20-bis(ethylene ketal) 15-methylcarbonate can be separated into its components by subjecting the mixture to chromatography on a column of magnesium silicate (Florisil), eluting the column with Skellysolve B containing increasing proportions of acetone and combining and evaporating those fractions which, on the basis of infrared analysis and paper chromatographic analysis, are found to contain the desired materials.

Using the above procedure, but replacing dimethylcarbonate by diethylcarbonate, diisopropyl carbonate, and like dialkyl carbonates, there are obtained the corresponding alkylcarbonate esters of 15-hydroxy-14α-methylpregn-4-ene-3,11,20-trione 3,20-bis(ethylene ketal).

Using the procedure set forth in Example 2 above, but replacing 15 - hydroxy-14α-methylpregn-4-ene-3,11,20-trione 3,20-bis(ethylene ketal) by the corresponding 3,20-bis(2,2-dimethyl-1,2-propylene ketal), 3,20-bis(1,2-propylene ketal) or 3,20-bis(1,3-butylene ketal), there are obtained the 15α- and 15β-epimers of the 3,20-bis(2,2-dimethyl-1,2-propylene ketal), 3,20-bis(1,2-propylene ketal) and 3,20-bis(1,3-butylene ketal), respectively, of 15-hydroxy - 14α - methylpregn-4-ene-3,11,20-trione 15-methylcarbonate or other 15-alkylcarbonates thereof.

EXAMPLE 3

*14α-methylpregna-4,15(16)-diene-3,11,20-trione 3,20-bis(ethylene ketal)*

Four hundred milligrams of 15-hydroxy-14α-methylpregn-4-ene-3,11,20-trione 3,20-bis(ethylene ketal) 15-methylcarbonate (mixture of 15α- and 15β-epimers of melting point 195 to 197° C. prepared as described in Example 2) was heated at 310 to 340° C. for 10 minutes in vacuo. The product so obtained was dissolved in methylene chloride and chromatographed on a column of magnesium silicate (Florisil). The column was eluted with Skellysolve B containing increasing proportions of acetone and those fractions of eluate which, on the basis of infrared and paper chromatographic analysis were found to contain the desired material, were combined and evaporated to dryness. The residue was recrystallized from methanol. There was thus obtained 150 g. of 14α-methylpregna - 4,15(16) - diene-3,11,20-trione 3,20-bis(ethylene ketal) having a melting point of 192 to 198° C.

*Analysis.*—Calcd. for $C_{26}H_{36}O_5$: C, 72.86; H, 8.47. Found: C, 72.60; H, 8.57.

Using the above procedure but replacing the 3,20-bis (ethylene ketal) of 15-hydroxy-14α-methylpregn-4-ene-3,11,20-trione 15-methylcarbonate by the corresponding 3,20-bis(2,2-dimethyl-1,2-propylene ketal), 3,20-bis(1,2-propylene ketal), and 3,20-bis(1,3-butylene ketal), there are obtained respectively the 3,20-bis(2,2-dimethyl-1,2-propylene ketal), 3,20-bis(1,2-propylene ketal) and 3,20-bis(1,3-butylene ketal), respectively, of 14αmethylpregna-4,15(16)-diene-3,11,20-trione.

EXAMPLE 4

*14α-methyl-11-ketoprogesterone 3,20-bis(ethylene ketal)*

A solution of 2.4 g. of 14α-methylpregna-4,15(16)-diene-3,11,20-trione 3,20-bis(ethylene ketal) in 100 ml. of ethyl acetate was shaken with hydrogen in the presence of 200 mg. of platinum oxide until the theoretical quantity of hydrogen had been absorbed. The resulting mixture was filtered and the filtrate was evaporated to dryness under reduced pressure. The residue (2.7 g.) was recrystallized from ethyl acetate. There was thus obtained 14α-methyl-11-ketoprogesterone, 3,20-bis (ethylene ketal) in the form of a crystalline solid having a melting point of 234 to 239° C.

*Analysis.*—Calcd. for $C_{26}H_{38}O_5$: C, 72.52; H, 8.89. Found: C, 72.12; H, 9.12.

Using the above procedure, but replacing 14α-methylpregna-4,15(16)-diene-3,11,20 - trione 3,20 - bis(ethylene ketal) by the corresponding 3,20-bis(2,2-dimethyl-1,2-propylene ketal), 3,20-bis(1,2-propylene ketal) or 3,20-bis(1,3-butylene ketal), there are obtained the 3,20-bis(2,2-dimethyl-1,2-propylene ketal), 3,20-bis(1,2-propylene ketal), and 3,20-bis(1,3-butylene ketal), respectively, of 14α-methyl-11-ketoprogesterone.

EXAMPLE 5

14α-methyl-11-ketoprogesterone

To a solution of 2.5 g. of 14α-methyl-11-ketoprogesterone 3,20-bis(ethylene ketal) in 50 ml. of acetone was added 10 ml. of 1 percent aqueous sulfuric acid. The mixture was heated under reflux in an atmosphere of nitrogen for 30 minutes before being cooled and neutralized by the addition of sodium bicarbonate solution. The neutral solution was partially distilled to remove the acetone and the residue was poured into ice water. The solid which separated was isolated by filtration, dried, and recrystallized from ethyl acetate. There was thus obtained 1.56 g. of 14α-methyl-11-ketoprogesterone having a melting point of 236 to 240° C., undepressed by admixture with an authentic specimen. A second crop of 0.24 g. having a melting point of 224 to 230° C. was obtained by concentration of the mother liquors.

Using the above procedure, but replacing 14α-methyl-11-ketoprogesterone 3,20-bis(ethylene ketal) by the corresponding 3,20-bis(2,2-dimethyl-1,2-propylene ketal), 3,20-bis(1,2-propylene ketal), or 3,20-bis(1,3-butylene ketal), there is also obtained 14α-methyl-11-ketoprogesterone.

EXAMPLE 6

15-hydroxy-14α-methylpregn-4-ene-3,11,20-trione

Using the procedure described in Example 5, but replacing 14α-methyl-11-ketoprogesterone 3,20-bis(ethylene ketal) by the 15α- and 15β-epimers of 15-hydroxy-14α-methylpregn-4-ene-3,11,20-trione 3,20-bis(ethylene ketal) or the corresponding 3,20-bis(2,2-dimethyl-1,2-propylene ketal), 3,20-bis(1,2-propylene ketal), or 3,20-bis(1,3-butylene ketal) or like 3,20-bis(alkylene ketals), there are obtained the 15α- and 15β-epimers of 15-hydroxy-14α-methylpregn-4-ene-3,11,20-trione.

EXAMPLE 7

15-hydroxy-14α-methylpregn-4-ene-3,11,20-trione 15-methylcarbonate

Using the procedure described in Example 5, but replacing 14α-methyl-11-ketoprogesterone 3,20-bis(ethylene ketal) by the 15α- or 15β-epimers of 15-hydroxy-14α-methylpregn-4-ene-3,11,20-trione 3,20-bis(ethylene ketal) 15-methylcarbonate or the corresponding 3,20-bis(2,2-dimethyl-1,2-propylene ketal), 3-20-bis(1,2-propylene ketal) or 3,20-bis(1,2-butylene ketal), there are obtained the 15α- and 15β-epimers of 15-hydroxy-14α-methyl-pregn-4-ene-3,11,20-trione 15-methylcarbonate.

Similarly, the 15α- and 15β-epimers of other 15-alkyl-carbonates of 15-hydroxy-14α-methylpregn-4-ene-3,11,20-trione such as the 15-ethylcarbonate, 15-isopropylcarbonate, and the like, can be obtained by hydrolysis of the corresponding 3,20-bis(alkylene ketals).

EXAMPLE 8

14α-methylpregna-4,15(16)-diene-3,11,20-trione

Using the procedure described in Example 5, but replacing 14α-methyl-11-ketoprogesterone 3,20-bis(ethylene ketal) by 14α-methylpregna-4,15(16)-diene-3,11,20-trione 3,20-bis(ethylene ketal) or like 3,20-bis(alkylene ketals) thereof such as the 3,20-bis(2,2-dimethyl-1,2-propylene ketal), 3,20-bis(1,2-propylene ketal), 3,20-bis(1,2-butylene ketal), or the like, there is obtained 14α-methylpregna-4,15(16)-diene-3,11,20-trione.

I claim:

1. In a process for the preparation of 14α-methyl-11-ketoprogesterone the steps comprising selectively reducing 14α-methyl-11,15-diketoprogesterone 3,20-bis(alkylene ketal), wherein the alkylene radical contains from 2 to 6 carbon atoms, inclusive, and the attaching oxygen to carbon bonds of the alkylene ketal group are separated by a chain of from 2 to 3 carbon atoms, inclusive, with an alkali metal borohydride in the presence of an inert organic solvent to obtain the corresponding 15-hydroxy-14α-methyl-11-ketoprogesterone 3,20-bis(alkylene ketal), reacting the latter compound with a dimethylcarbonate in the presence of an alkali metal hydride and an inert organic solvent to obtain the corresponding 15-hydroxy-14α-methyl-11-ketoprogesterone 3,20-bis(alkylene ketal) 15-methylcarbonate, pyrolyzing the latter compound by heating at a temperature within the range of about 300° C. to about 350° C. to form the corresponding 14α-methyl-pregna-4,15(16)-diene-3,11,20-trione 3,20-bis(alkylene ketal), hydrogenating the latter compound in the presence of a hydrogenation catalyst to obtain the corresponding 14α-methyl-11-ketoprogesterone 3,20-bis(alkylene ketal), and subjecting the latter compound to acid hydrolysis to obtain 14α-methyl-11-ketoprogesterone.

2. The process which comprises selectively reducing 14α-methyl-11,15-diketoprogesterone 3,20-bis(alkylene ketal), wherein the alkylene radical contains from 2 to 6 carbon atoms, inclusive, and the attaching oxygen to carbon bonds of the alkylene ketal group are separated by a chain of from 2 to 3 carbon atoms, inclusive, with an alkali metal borohydride in the presence of an inert organic solvent to obtain the corresponding 15-hydroxy-14α-methyl-11-ketoprogesterone 3,20-bis(alkylene ketal).

3. The process of claim 2 wherein the reducing agent is sodium borohydride.

4. The process which comprises reacting 15-hydroxy-14α-methyl-11-ketoprogesterone 3,20-bis(alkylene ketal), wherein the alkylene radical contains from 2 to 6 carbon atoms, inclusive, and the attaching oxygen to carbon bonds of the alkylene ketal group are separated by a chain of from 2 to 3 carbon atoms, inclusive, with a dialkylcarbonate in the presence of an alkali metal hydride and an inert organic solvent to obtain the corresponding 15-hydroxy-14α-methylpregn-4-ene-3,11,20-trione 3,20-bis(alkylene ketal) 15-alkylcarbonate.

5. The process which comprises subjecting 15-hydroxy-14α-methylpregn-4-ene-3,11,20-trione, 3,20-bis(alkylene ketal) 15-methylcarbonate, wherein the alkylene radical contains from 2 to 6 carbon atoms, inclusive, and the attaching oxygen to carbon bonds of the alkylene ketal group are separated by a chain of from 2 to 3 carbon atoms, inclusive, to pyrolysis at a temperature of from about 300° C. to about 350° C. to obtain the corresponding 14α-methylpregna-4,15(16)-diene-3,11,20-trione 3,20-bis(alkylene ketal).

6. The process which comprises hydrogenating 14α-methylpregna-4,15(16)-diene-3,11,20-trione 3,20-bis(alkylene ketal), wherein the alkylene radical contains from 2 to 6 carbon atoms, inclusive, and the attaching oxygen to carbon bonds of the alkylene ketal group are separated by a chain of from 2 to 3 carbon atoms, inclusive, in the presence of a hydrogenation catalyst, to obtain the corresponding 14α-methyl-11-ketoprogesterone 3,20-bis(alkylene ketal).

7. In a process for the preparation of 14α-methyl-11-ketoprogesterone the steps comprising reacting 15-hydroxy-14α-methylpregn-4-ene-3,11,20-trione 3,20-bis(alkylene ketal), wherein the alkylene radical contains from 2 to 6 carbon atoms, inclusive, and the attaching oxygen to carbon bonds of the alkylene ketal group are separated by a chain of from 2 to 3 carbon atoms, inclusive, with dimethylcarbonate in the presence of an alkali metal hydride and an inert organic solvent to obtain the corresponding 15-hydroxy-14α-methylpregn-4-ene-3,11,20-trione 3,20-bis(alkylene ketal) 15-methylcarbonate, subjecting the latter compound to pyrolysis at a temperature of from about 300° C. to about 350° C. to obtain the corresponding 14α-methylpregn-4,15(16)-diene-3,11,20-trione, 3,20-bis(alkylene ketal), hydrogenating the latter compound in the presence of a hydrogenation catalyst to obtain the corresponding 14α-methyl-11-ketoprogesterone 3,20-bis(alkylene ketal), and subjecting the latter compound to acid hydrolysis to obtain 14α-methyl-11-ketoprogesterone.

8. In a process for the preparation of 14α-methyl-11-ketoprogesterone the steps comprising subjecting 15-hydroxy-14α-methylpregn-4-ene-3,11,20-trione 3,20 - bis-(alkylene ketal) 15-methylcarbonate wherein the alkylene radical contains from 2 to 6 carbon atoms, inclusive, and the attaching oxygen to carbon bonds of the alkylene ketal group are separated by a chain of from 2 to 3 carbon atoms, inclusive, to pyrolysis at a temperature of from about 300° C. to about 350° C., to obtain the corresponding 14α-methylpregna - 4,15(16) - diene-3,11,20-trione 3,20-bis(alkylene ketal), hydrogenating the latter compound in the presence of a hydrogenation catalyst to obtain the corresponding 14α-methyl-11-ketoprogesterone 3,20-bis(alkylene ketal) and subjecting the latter compound to acid hydrolysis to obtain the desired 14α-methyl-11-ketoprogesterone.

9. In a process for the preparation of 14α-methyl-11-ketoprogesterone the steps comprising hydrogenating 14α-methylpregna-4,15(16)-diene-3,11,20-trione 3,20 - bis(alkylene ketal), wherein the alkylene radical contains from 2 to 6 carbon atoms, inclusive, and the attaching oxygen to carbon bonds of the alkylene ketal group are separated by a chain of from 2 to 3 carbon atoms, inclusive, in the presence of a hydrogenation catalyst to obtain the corresponding 14α-methyl-11-ketoprogesterone 3,20-bis-(alkylene ketal) and subjecting the latter compound to acid hydrolysis to obtain the desired 14α-methyl-11-ketoprogesterone.

10. A compound having the formula:

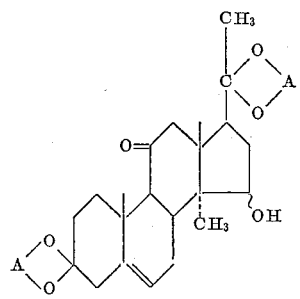

wherein A is an alkylene radical containing from 2 to 6 carbon atoms, inclusive, and the attaching carbon to oxygen bonds are separated by from 2 to 3 carbon atoms, inclusive.

11. 15α - hydroxy-14α-methylpregn-4-ene-3,11,20-trione 3,20-bis(ethylene ketal).

12. 15β - hydroxy-14α-methylpregn-4-ene-3,11,20-trione 3,20-bis(ethylene ketal).

13. 15α-hydroxy-14α-methylpregn-4-ene-3,11,20-trione.
14. 15β-hydroxy-14α-methylpregn-4-ene-3,11,20-trione.
15. A compound having the formula:

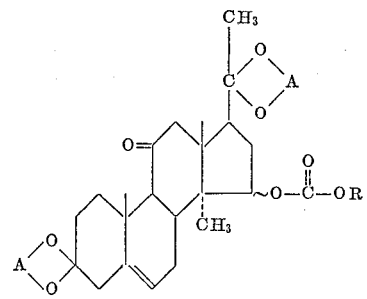

wherein A is an alkylene radical containing from 2 to 6 carbon atoms, inclusive, and the attaching oxygen to carbon bonds are separated by from 2 to 3 carbon atoms, inclusive, and R is alkyl containing from 1 to 6 carbon atoms, inclusive.

16. 15α - hydroxy-14α-methylpregn-4-ene-3,11,20-trione 3,20-bis(ethylene ketal) 15-methylcarbonate.

17. 15β - hydroxy-14α-methylpregn-4-ene-3,11,20-trione 3,20-bis(ethylene ketal) 15-methylcarbonate.

18. A compound having the formula:

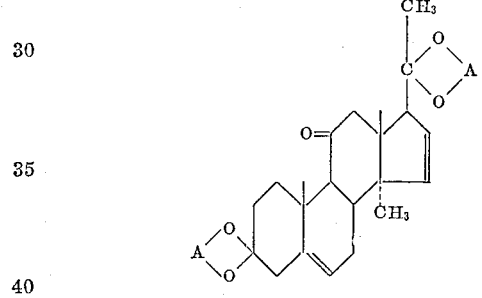

wherein A is an alkylene radical containing from 2 to 6 carbon atoms, inclusive, and the attaching oxygen to carbon bonds are separated by from 2 to 3 carbon atoms, inclusive.

19. 14α-methylpregna - 4,15(16) - diene-3,11,20-trione 3,20-bis(ethylene ketal).

20. 14α-methylpregna-4,15(16)-diene-3,11,20-trione.

References Cited in the file of this patent
UNITED STATES PATENTS

| 2,782,212 | Heuser et al. | Feb. 19, 1957 |
| 3,021,327 | Beal et al. | Feb. 13, 1962 |

UNITED STATES PATENT OFFICE
CERTIFICATE OF CORRECTION

Patent No. 3,166,528                  January 19, 1965

Philip F. Beal

It is hereby certified that error appears in the above numbered patent requiring correction and that the said Letters Patent should read as corrected below.

Column 7, line 66, for "-14α-ethylpregn-" read -- -14α-methylpregn- --; column 8, line 40, for "150 g." read -- 150 mg. --; line 51, for "14αmethylpregna-" read -- 14α-methylpregna- --.

Signed and sealed this 16th day of November 1965.

(SEAL)
Attest:

ERNEST W. SWIDER
Attesting Officer

EDWARD J. BRENNER
Commissioner of Patents